US012758923B2

(12) United States Patent
Roy et al.

(10) Patent No.: US 12,758,923 B2
(45) Date of Patent: Oct. 13, 2026

(54) METHODS FOR MANUFACTURING HOLLOW FIBER CARBON MEMBRANES

(71) Applicant: Dow Global Technologies LLC, Midland, MI (US)

(72) Inventors: Abhishek Roy, Freeport, TX (US); Thomas C. Fitzgibbons, Freeport, TX (US); Li Tang, Freeport, TX (US); Surendar R. Venna, Freeport, TX (US); Derrick W. Flick, Freeport, TX (US); Nikki J. Montanez, Freeport, TX (US); Hali J. McCurry, Freeport, TX (US); James B. Heard, Freeport, TX (US); Barry B. Fish, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 252 days.

(21) Appl. No.: 18/580,191

(22) PCT Filed: Jul. 21, 2022

(86) PCT No.: PCT/US2022/037843
§ 371 (c)(1),
(2) Date: Jan. 18, 2024

(87) PCT Pub. No.: WO2023/004024
PCT Pub. Date: Jan. 26, 2023

(65) Prior Publication Data

US 2024/0325985 A1 Oct. 3, 2024

Related U.S. Application Data

(60) Provisional application No. 63/224,085, filed on Jul. 21, 2021.

(51) Int. Cl.

| | |
|---|---|
| ***B01D 53/02*** | (2006.01) |
| ***B01D 53/22*** | (2006.01) |
| ***B01D 67/00*** | (2006.01) |
| ***B01D 69/02*** | (2006.01) |
| ***B01D 69/08*** | (2006.01) |
| ***B01D 71/02*** | (2006.01) |

(52) U.S. Cl.
CPC ....... *B01D 67/0067* (2013.01); *B01D 53/228* (2013.01); *B01D 69/02* (2013.01); *B01D 69/088* (2013.01); *B01D 71/021* (2013.01); *B01D 2256/16* (2013.01); *B01D 2256/22* (2013.01); *B01D 2256/24* (2013.01); *B01D 2257/102* (2013.01); *B01D 2257/7022* (2013.01); *B01D 2323/081* (2022.08); *B01D 2323/60* (2022.08); *B01D 2325/023* (2013.01)

(58) Field of Classification Search
CPC ............ B01D 2256/16; B01D 2256/22; B01D 2256/24; B01D 2257/102; B01D 2257/108; B01D 2257/304; B01D 2257/504; B01D 2257/7022; B01D 2257/7025; B01D 2323/081; B01D 2323/28; B01D 2323/60; B01D 2325/023; B01D 53/228; B01D 67/0067; B01D 69/02; B01D 69/088; B01D 71/021
See application file for complete search history.

(56) References Cited

U.S. PATENT DOCUMENTS

| | | | | |
|---|---|---|---|---|
| 4,685,940 | A | 8/1987 | Soffer et al. | |
| 5,912,048 | A | 6/1999 | Rao et al. | |
| 6,565,631 | B2 | 5/2003 | Koros et al. | |
| 8,709,133 | B2 | 4/2014 | Kiyono et al. | |
| 2013/0030592 | A1 | 1/2013 | Magori | |
| 2013/0305921 | A1 | 11/2013 | Kiyono et al. | |
| 2016/0346740 | A1 | 12/2016 | Koros et al. | |
| 2019/0054427 | A1* | 2/2019 | Zhang | B01J 27/20 |
| 2019/0247806 | A1* | 8/2019 | Xu | B01D 67/0013 |
| 2020/0254393 | A1* | 8/2020 | Xu | B01D 67/0067 |
| 2020/0276542 | A1 | 9/2020 | Chu et al. | |
| 2021/0129085 | A1* | 5/2021 | Xu | B01D 69/02 |
| 2021/0138407 | A1 | 5/2021 | Liu et al. | |

FOREIGN PATENT DOCUMENTS

| | | | |
|---|---|---|---|
| CN | 111971113 | A | 11/2020 |
| EP | 0459623 | A1 | 12/1991 |
| JP | H0398625 | A | 4/1991 |
| JP | 2020507457 | A | 3/2020 |
| JP | 2020530811 | A | 10/2020 |
| JP | 2021502231 | A | 1/2021 |
| WO | 2019212647 | A1 | 11/2019 |
| WO | 2019212648 | A1 | 11/2019 |

OTHER PUBLICATIONS

Kuwait Examination Report dated May 1, 2025, pertaining to KW Patent Application No. KW/P/2024/000336, 6 pgs.
Kuakabe et al. "Gas permeation and micropore structure of carbon molecular sieving membranes modified by oxidation", Journal of Membrane Science 149 (1998) 59-67.
International Search Report and Written Opinion dated Oct. 28, 2022, pertaining to Int'l Patent Application No. PCT/US2022/037838, 34 pgs.
International Search Report and Written Opinion dated Oct. 28, 2022, pertaining to Int'l Patent Application No. PCT/US2022/037843, 19 pgs.
International Search Report and Written Opinion dated Oct. 31, 2022, pertaining to Int'l Patent Application No. PCT/US2022/037840, 33 pgs.

(Continued)

*Primary Examiner* — Christopher P Jones
(74) *Attorney, Agent, or Firm* — Dinsmore & Shohl LLP

(57) ABSTRACT

A method of manufacturing a hollow fiber carbon membrane, the method includes heating a polymeric precursor to a pyrolysis temperature that is greater than or equal to 900° C. and less than or equal to 1200° C., and pyrolyzing the polymeric precursor at the pyrolysis temperature in a pyrolysis atmosphere that comprises oxygen in an amount that is greater than 0 ppm and less than 200 ppm.

12 Claims, No Drawings

(56) References Cited

OTHER PUBLICATIONS

Kamath et al. "Pyrolysis End-Doping to Optimize Transport Properties of Carbon Molecular Sieve Hollow Fiber Membranes" https://doi.org/10.1021/acs.iecr.0c02479.
Fuertes, "Adsorption-selective carbon membrane for gas separation", Journal of Membrane Science, 177 (2000) pp. 9-16.
Fuertes, "Effect of air oxidation on gas separation properties of adsorption-selective carbon membranes", Carbon, 39 (2001) pp. 697-706.
Hayashi et al., "Effect of Oxidation on Gas Permeation of Carbon Molecular Sieving Membranes Based on BPDA-pp'ODA Polymide", Ind. Eng. Chem. Res. 1997, 36, pp. 2134-2140.
Hazazi et al., "Ultra-selective carbon molecular sieve membranes for natural gas separations based on a carbon-rich intrinsically microporous polyimide precursor", Journal of Membrane Science 585 (2019) pp. 1-9.
C.H. Lau et al., "Reverse-selective polymeric membranes for gas separations", Progress in Polymer Science 38 (2013) pp. 740-766.
T.C. Merkel et al., "Ultrapermeable, Reverse-Selective Nanocomposite Membranes", Science, vol. 296 (Apr. 19, 2002), pp. 519-522.
Ogieglo et al., "Thin Composite Carbon Molecular Sieve Membranes from a Polymer of Intrinsic Microporosity Precursor", ACS Appl. Mater. Interfaces 2019, 11, pp. 18770-18781.
M.B. Rao et al., "Nanoporous carbon membranes for separation of gas mixtures by selective surface flow", Journal of Membrane Science, 85 (1993) pp. 253-264.
Yamamoto et al.,"Carbon molecular sieve membrane formed by oxidative carbonization of a copolyimide film coated on a porous support tube", Journal of Membrane Science, 133 (1997) pp. 195-206.
Zhang et al., "Ultraselective Carbon Molecular Sieve Membranes with Tailored Synergistic Sorption Selective Properties", Adv. Mater. 2017, 29, 1701631, pp. 1 of 6.
Saudi Arabian Examination Report dated Feb. 2, 2026, pertaining to SA Patent Application No. 1120246193, 5 pgs.
Araújo et al. "Cellulose-Based Carbon Molecular Sieve Membranes for Gas Separation", Molecules 2020, 25, 3532.
Japanese Office Action dated Jun. 18, 2026, pertaining to JP Patent Application No. 2024-501137, 18 pgs.
Brazilian Technical Examination Report dated May 21, 2026, pertaining to BR Patent Application No. BR112024000063.0, 8 pgs.

* cited by examiner

METHODS FOR MANUFACTURING HOLLOW FIBER CARBON MEMBRANES

CROSS REFERENCE TO RELATED APPLICATIONS

This application is a National Phase Entry under 35 U.S.C. § 371 of International Patent Application No. PCT/US2022/037843 filed Jul. 21, 2022, which claims priority to U.S. Provisional Patent Application No. 63/224,085, filed Jul. 21, 2021, the contents of which are incorporated in their entirety herein.

TECHNICAL FIELD

Embodiments of the present disclosure generally relate to hollow fiber carbon molecular sieve (CMS) membranes for use in gas separation, and in particular, methods for producing hollow fiber CMS membranes with high selectivity.

BACKGROUND

Membranes are widely used for the separation of gases and liquids, including for example, separating acid gases, such as $CO_2$ and $H_2S$ from natural gas, and the removal of 02 from air. Gas transport through such membranes is commonly modeled by the sorption-diffusion mechanism. Currently, polymeric membranes are well studied and widely available for gaseous separations due to easy processability and low cost. CMS membranes, however, have been shown to have attractive separation performance properties exceeding that of polymeric membranes.

CMS membranes are typically produced through thermal pyrolysis of polymer precursors. For example, it is known that defect-free hollow fiber CMS membranes can be produced by pyrolyzing cellulose hollow fibers. In addition, many other polymers have been used to produce CMS membranes in fiber and dense film form, among which polyimides have been favored. Polyimides have a high glass transition temperature, are easy to process, and perform better than most other polymeric membranes, even prior to pyrolysis.

SUMMARY

One type of separation application in which CMS membranes may find utility is olefin-paraffin separation. In olefin-paraffin separations, it is necessary to separate olefins from paraffin in addition from lighter gases, such as $H_2$, $CO_2$, and $CH_4$. New CMS membranes and methods of making these CMS membranes are needed.

According to aspects, a method of manufacturing a hollow fiber carbon membrane comprises heating a polymeric precursor to a pyrolysis temperature that is greater than or equal to 900° C. and less than or equal to 1200° C.; and pyrolyzing the polymeric precursor at the pyrolysis temperature in a pyrolysis atmosphere that comprises oxygen in an amount that is greater than 0 ppm and less than 200 ppm.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

DETAILED DESCRIPTION

CMS membranes according to embodiments disclosed and described herein advantageously separate olefins from paraffins as well as separating $CO_2$ from flue gas and natural gas ($CH_4$) and separation of $CO_2$ from $H_2$ and other lighter gases used in gasification and syngas-to-olefin conversion processes. Of particular interest is the olefin from paraffin separation of ethylene from ethane. Methods according to embodiments disclosed and described herein have economical advantages over current separation technologies like cryogenic $C_2$ distillation ($C_2$ splitter) in terms of both CAPEX and OPEX and the like.

CMS membrane separation properties are primarily affected by the following factors: (1) pyrolysis precursor, (2) pyrolysis temperature, (3) thermal soak time, and (4) pyrolysis atmosphere. For example, increases in both temperature and thermal soak time have been shown to increase the selectivity but decrease permeance for $CO_2/CH_4$ separation. In addition, a precursor polymer with a rigid, tightly packed structure tends to lead to a CMS membrane having higher selectivity compared with less rigid precursor polymers. The impact of pyrolysis atmosphere gas has not been studied in great detail, nor have the long-term use of the CMS membranes and the stability of the membranes with respect to maintaining the permeance and selectivity for particular gas molecules of interest.

According to one or more embodiments described herein, a method of manufacturing a hollow fiber carbon membrane according to embodiments includes heating a polymeric precursor to a pyrolysis temperature that is greater than or equal to 900° C. and less than or equal to 1200° C.; and pyrolyzing the polymeric precursor at the pyrolysis temperature in a pyrolysis atmosphere that comprises oxygen in an amount that is greater than 0 ppm and less than 200 ppm. Exemplary polymeric precursors will now be described.

The polymeric precursor may be any useful polymer for making hollow fiber CMS membranes, such as polyimides for example. In one or more embodiments, the polymeric precursor comprises a polymer formed from one or more monomers selected from the group consisting of 2,4,6-trimethyl-1,3-phenylene diamine (DAM), oxydianaline (ODA), dimethyl-3,7-diaminodiphenyl-thiophene-5,5'-dioxide (DDBT), 3,5-diaminobenzoic acid (DABA), 2.3,5,6-tetramethyl-1,4-phenylene diamine (durene), meta-phenylenediamine (m-PDA), 2,4-diaminotolune (2,4-DAT), tetramethylmethylenedianaline (TMMDA), 4,4'-diamino-2,2'-biphenyl disulfonic acid (BDSA); 5,5'-[2,2,2-trifluoro-1-(trifluoromethyl)ethylidene]-1,3-isobenzofurandion (6FDA), 3,3',4,4'-biphenyl tetracarboxylic dianhydride (BPDA), pyromellitic dianhydride (PMDA), 1,4,5,8-naphthalene tetracarboxylic dianhydride (NTDA), 4,4'-Oxydiphthalic anhydride (ODPA), and benzophenone tetracarboxylic dianhydride (BTDA).

The polymeric precursor may be any useful polymer for making hollow fiber CMS membranes, such as polyimides for example. When a polyimide is used, the polyimide may be a conventional or fluorinated polyimide. In embodiments, the polymeric precursor may comprise a polymer comprising monomers $A_X$, $B_Y$, and $C_Z$, where X, Y, and Z are the mole fraction of each of A, B, and C, respectively, present in the polymer. In embodiments, X+Y+Z=1. In other embodiments, X+Y+Z<1, and other monomers are present in the polymer.

Each of A, B, and C is a monomer selected from the group consisting of 2,4,6-trimethyl-1,3-phenylene diamine (DAM); oxydianaline (ODA); dimethyl-3,7-diaminodiphenyl-thiophene-5,5'-dioxide (DDBT); 3,5-diaminobenzoic acid (DABA); 2.3,5,6-tetramethyl-1,4-phenylene diamine (durene); meta-phenylenediamine (m-PDA); 2,4-diaminotolune (2,4-DAT); tetramethylmethylenedianaline (TMMDA); 4,4'-diamino-2,2'-biphenyl disulfonic acid (BDSA); 5,5'-[2,2,2-trifluoro-1-(trifluoromethyl)ethylidene]-1,3-isobenzofurandion (6FDA); 3,3',4,4'-biphenyl tetracarboxylic dianhydride (BPDA); pyromellitic dianhydride (PMDA); 1,4,5,8-naphthalene tetracarboxylic dianhydride (NTDA); 4,4'-oxydiphthalic anhydride (ODPA); 5(6)-amino-1-(4'-aminophenyl)-1,3,3-trimethylindane (DAPI); and 3,3',4,4'-benzophenone tetracarboxylic dianhydride (BTDA). In embodiments, polyimides may contain at least two different moieties selected from DAM; ODA; DDBT; DABA; durene; m-PDA; 2,4-DAT; TMMDA; BDSA; 6FDA; BPDA; PMDA; NTDA; and BTDA.

In embodiments, A is a monomer selected from the group consisting of 6FDA, ODPA, and BTDA; B is DAM; and C is a monomer selected from the group consisting of BPDA and PMDA. In embodiments, A is 6FDA; B is DAM; and Z is 0. In embodiments, the polyimide may be MATRIMID™ 5218 (Huntsman Advanced Materials), a commercially available polyimide in which A is BTDA; B is DAPI; and Z is 0.

In embodiments, the polyimide may comprise, consist essentially of, or consist of 6FDA/BPDA-DAM, as shown in formula (1), which may be synthesized via thermal or chemical processes from a combination of three commercially available monomers: DAM; 6FDA, and BPDA. In embodiments of formula (1), X+Y may be from 0.1 to 0.9, and Z may be from 0.1 to 0.9. In embodiments of formula (1), X+Y may be from 0.1 to 1, and Z may be from 0 to 0.9. In embodiments of formula (1), X may be 0 and Y+Z may be 1. In embodiments, X and Z may be from 0.25, 0.3, or 0.4 to 0.9, 0.8, or 0.75. In embodiments, X+Y is 0.5 and Z is 0.5. Formula (2) below shows a representative structure for 6FDA/BPDA-DAM, with a potential for adjusting the ratio between X and Z to tune polymer properties. In embodiments, a 1:1 ratio of X to Z may also be abbreviated as 6FDA/BPDA (1:1)-DAM.

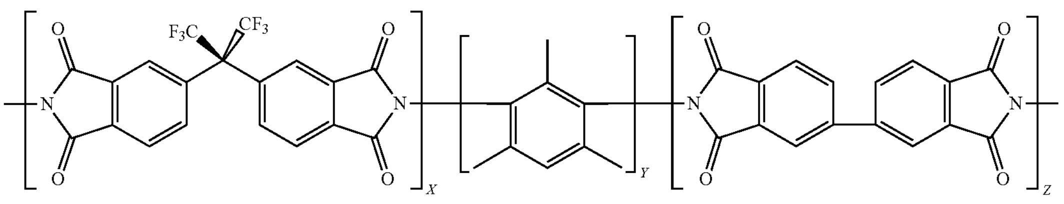

(1)

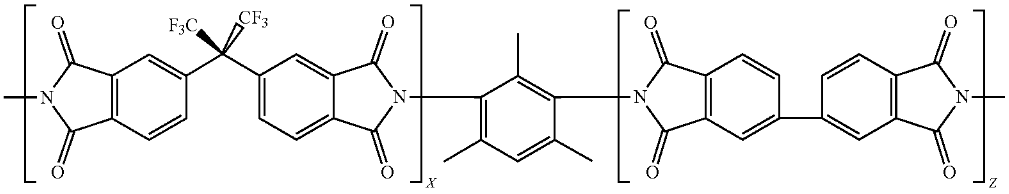

(2)

In embodiments, the polyimide may be formed by the reaction of a diamine with a dianhydride. In such embodiments, at least one of A, B, and C, is a diamine, and at least one other of A, B, and C, is a dianhydride. In embodiments, the total diamine and the total dianhydride may be in a molar ratio of diamine to dianhydride of greater than or equal to 49:51 to 51:49. In embodiments, the diamine and dianhydride may be in a molar ratio of diamine to dianhydride of about 50:50.

In embodiments, more than one dianhydride may be used with one diamine. In such embodiments using two dianhydrides, dianhydride 1 and dianhydride 2, the molar ratio of dianhydride 1 to dianhydride 2 may be greater than or equal to 20:80 and less than or equal to 80:20. For example, this molar ratio may be greater than or equal to 25:75 and less than or equal to 75:25, greater than or equal to 30:70 and less than or equal to 70:30, greater than or equal to 35:65 and less than or equal to 65:35, greater than or equal to 40:60 and less than or equal to 60:40, or even greater than or equal to 45:55 and less than or equal to 55:45. In embodiments, the molar ratio of dianhydride 1 to dianhydride 2 may be about 50:50. In embodiments, one dianhydride may be used with more than one diamines. In such embodiments using two diamines, diamine 1 and diamine 2, the molar ratio of diamine 1 to diamine 2 may be greater than or equal to 20:80 and less than or equal to 80:20. For example, this molar ratio may be greater than or equal to 25:75 and less than or equal to 75:25, greater than or equal to 30:70 and less than or equal to 70:30, greater than or equal to 35:65 and less than or equal to 65:35, greater than or equal to 40:60 and less than or equal to 60:40, or even greater than or equal to 45:55 and less than or equal to 55:45. In embodiments, the molar ratio of diamine 1 to diamine 2 may be about 50:50. In embodiments, the polymeric precursor membranes as produced, but not pyrolyzed, are substantially defect-free. "Defect-free" means that selectivity of a gas pair through a hollow fiber membrane is at least 90 percent of the selectivity for the same gas pair through a dense film prepared from the same composition as that used to make the polymeric precursor membrane. By way of illustration, a 6FDA/BPDA(1:1)-

DAM polymer has an $O_2/N_2$ selectivity (also known as "dense film selectivity") of 4.1.

In embodiments, the precursor polymers may be formed into hollow fibers or films. Conventional procedures to make these may be used. For example, coextrusion procedures including a dry-jet wet spinning process (in which an air gap exists between the tip of the spinneret and the coagulation or quench bath) or a wet spinning process (with zero air-gap distance) may be used to make hollow fibers.

Despite using the polymer precursors described above, it can still be difficult to obtain a CMS membrane that is capable of high performance while also being capable of separating olefins from paraffins. For instance, the most common separation mechanism for gas separation is based on the size differences between the gas pairs. For ethylene/ethane separation, the size difference between the two gas molecules is relatively small (0.1 Å) compared to other gas pairs. As a result, it is very difficult to achieve very high selectivity using a membrane based separation technology. CMS membranes have a very tight size cut off and provide better selectivity on size base selection as compared with polymeric membranes. However, it is still difficult to achieve high selectivity—particularly for the ethylene-ethane gas pairs. In addition to achieving high selectivity, it is even more challenging to achieve high selectivity and permeability at the same time. Permeability is important in reducing the area of the membrane.

One of the ways ultra selective asymmetric CMS membranes according to embodiments disclosed and described herein are produced is by pyrolysis of polymeric hollow fiber at a temperature greater than 900 degrees Celsius (° C.). Conventional knowledge was that increasing pyrolysis temperature results in a corresponding increase in selectivity, but increasing pyrolysis temperature results in a decrease of permeability. For instance, Koros et al. (Adv.Mater.2017, 29, 1701631) reports synthesis of ultra selective CMS dense membrane by pyrolyzing MATRIMID based precursor at high temperature (900° C.). This trend is consistent with Pinnau et al. (https://doi.org/10.1016/j.memsci.2019.05.020), which reports a decrease in membrane permeability with increase in membrane selectivity for selected gas pairs. Thus, Conventional knowledge is that permeability and ultra high selectivity are inversely related.

However, an unexpected anomaly in the above trend (i.e., the inverse relationship between permeability and selectivity) was observed where a modest increase in permeability with a step change in selectivity was observed for fibers pyrolyzed at certain temperatures. This allows synthesis of high selective CMS asymmetric membranes without sacrificing too much of permeability when CMS membranes are formed under certain pyrolysis conditions.

Pyrolysis conditions will now be described. Any suitable supporting means for holding the hollow fiber CMS membranes may be used during the pyrolysis including sandwiching between two metallic wire meshes or using a stainless steel mesh plate in combination with stainless steel wires and as described by U.S. Pat. No. 8,709,133 at col. 6, line 58 to col. 7, line 4, which is incorporated by reference.

Precursor polymers may be pyrolyzed to form the hollow fiber CMS membranes (i.e., carbonize the precursor polymer) under various inert gas purge or vacuum conditions (e.g. a pressure less than or equal to 0.1 millibar). U.S. Pat. No. 6,565,631 describes a heating method for pyrolysis of polymeric fibers to form hollow fiber CMS membranes, and is incorporated herein by reference. According to embodiments, the pyrolysis temperature of method for manufacturing hollow fiber carbon membrane may be greater than or equal to 900° C. and less than or equal to 1200° C. The pyrolysis temperature may be adjusted in combination with the pyrolysis atmosphere to tune the performance properties of the resulting hollow fiber CMS membrane. In embodiments, the pyrolysis temperature may be greater than or equal to 925° C. and less than or equal to 1200° C., greater than or equal to 950° C. and less than or equal to 1200° C., greater than or equal to 975° C. and less than or equal to 1200° C., greater than or equal to 1000° C. and less than or equal to 1200° C., greater than or equal to 1025° C. and less than or equal to 1200° C., greater than or equal to 1050° C. and less than or equal to 1200° C., greater than or equal to 1075° C. and less than or equal to 1200° C., greater than or equal to 1100° C. and less than or equal to 1200° C., greater than or equal to 1125° C. and less than or equal to 1200° C., greater than or equal to 1150° C. and less than or equal to 1200° C., greater than or equal to 1175° C. and less than or equal to 1200° C., greater than or equal to 900° C. and less than or equal to 1175° C., greater than or equal to 925° C. and less than or equal to 1175° C., greater than or equal to 950° C. and less than or equal to 1175° C., greater than or equal to 975° C. and less than or equal to 1175° C., greater than or equal to 1000° C. and less than or equal to 1175° C., greater than or equal to 1025° C. and less than or equal to 1175° C., greater than or equal to 1050° C. and less than or equal to 1175° C., greater than or equal to 1075° C. and less than or equal to 1175° C., greater than or equal to 1100° C. and less than or equal to 1175° C., greater than or equal to 1125° C. and less than or equal to 1175° C., greater than or equal to 1150° C. and less than or equal to 1175° C., greater than or equal to 900° C. and less than or equal to 1150° C., greater than or equal to 925° C. and less than or equal to 1150° C., greater than or equal to 950° C. and less than or equal to 1150° C., greater than or equal to 975° C. and less than or equal to 1150° C., greater than or equal to 1000° C. and less than or equal to 1150° C., greater than or equal to 1025° C. and less than or equal to 1150° C., greater than or equal to 1050° C. and less than or equal to 1150° C., greater than or equal to 1075° C. and less than or equal to 1150° C., greater than or equal to 1100° C. and less than or equal to 1150° C., greater than or equal to 1125° C. and less than or equal to 1150° C., greater than or equal to 900° C. and less than or equal to 1125° C., greater than or equal to 925° C. and less than or equal to 1125° C., greater than or equal to 950° C. and less than or equal to 1125° C., greater than or equal to 975° C. and less than or equal to 1125° C., greater than or equal to 1000° C. and less than or equal to 1125° C., greater than or equal to 1025° C. and less than or equal to 1125° C., greater than or equal to 1050° C. and less than or equal to 1125° C., greater than or equal to 1075° C. and less than or equal to 1125° C., greater than or equal to 1100° C. and less than or equal to 1125° C., greater than or equal to 900° C. and less than or equal to 1100° C., greater than or equal to 925° C. and less than or equal to 1100° C., greater than or equal to 950° C. and less than or equal to 1100° C., greater than or equal to 975° C. and less than or equal to 1100° C., greater than or equal to 1000° C. and less than or equal to 1100° C., greater than or equal to 1025° C. and less than or equal to 1100° C., greater than or equal to 1050° C. and less than or equal to 1100° C., greater than or equal to 1075° C. and less than or equal to 1100° C., greater than or equal to 900° C. and less than or equal to 1075° C., greater than or equal to 925° C. and less than or equal to 1075° C., greater than or equal to 950° C. and less than or equal to 1075° C., greater than or equal to 975° C. and less than or equal to 1075° C., greater than or equal to 1000° C. and less than or equal to 1075° C., greater than or equal to 1025° C.

and less than or equal to 1075° C., greater than or equal to 1050° C. and less than or equal to 1075° C., greater than or equal to 900° C. and less than or equal to 1050° C., greater than or equal to 925° C. and less than or equal to 1050° C., greater than or equal to 950° C. and less than or equal to 1050° C., greater than or equal to 975° C. and less than or equal to 1050° C., greater than or equal to 1000° C. and less than or equal to 1050° C., greater than or equal to 1025° C. and less than or equal to 1050° C., greater than or equal to 900° C. and less than or equal to 1025° C., greater than or equal to 925° C. and less than or equal to 1025° C., greater than or equal to 950° C. and less than or equal to 1025° C., greater than or equal to 975° C. and less than or equal to 1025° C., greater than or equal to 1000° C. and less than or equal to 1025° C., greater than or equal to 900° C. and less than or equal to 1000° C., greater than or equal to 925° C. and less than or equal to 1000° C., greater than or equal to 950° C. and less than or equal to 1000° C., greater than or equal to 975° C. and less than or equal to 1000° C., greater than or equal to 900° C. and less than or equal to 975° C., greater than or equal to 925° C. and less than or equal to 975° C., greater than or equal to 950° C. and less than or equal to 975° C., greater than or equal to 900° C. and less than or equal to 950° C., greater than or equal to 925° C. and less than or equal to 950° C., or greater than or equal to 900° C. and less than or equal to 925° C. At pyrolysis temperatures below 900° C. the desired selectivity is not obtainable, and at temperatures above 1200° C. the structure of the CMS membrane is compromised. It is envisioned that the range of acceptable pyrolysis temperatures may be greater than or equal to any of the temperatures described herein and less than or equal to any of the temperatures described herein.

The pyrolysis soak time (i.e., the duration of time at the pyrolysis temperature) may vary (and may include no soak time) but may be, for example, greater than or equal to 1 hour and less than or equal to 24 hours, greater than or equal to 2 hours and less than or equal to 8 hours, greater than or equal to 4 hours and less than or equal to 6 hours. An exemplary heating protocol may include: (1) starting at a first set point of about 50° C.; (2) heating to a second set point of about 250° C. at a rate of about 13.3° C. per minute; (3) heating to a third set point of about 535° C. at a rate of about 3.85° C. per minute; (4) heating to a fourth set point of about 550° C. at a rate of about 0.25° C. per minute. The fourth set point may then be maintained for the determined soak time.

As noted above, the precursor polymers may be pyrolyzed under various inert gas purge or vacuum conditions. In embodiments, the precursor polymers may be pyrolyzed under vacuum at low pressures (e.g. less than or equal to 0.1 millibar). In embodiments, the pyrolysis utilizes a controlled inert purge gas atmosphere with a small amount of oxidant, such as oxygen. Thus, in one or more embodiments, the pyrolysis atmosphere comprises an inert gas and oxygen. In embodiments, the inert gas is selected from the group consisting of nitrogen, helium, argon, or combinations thereof. In one or more embodiments, the inert purge gas is argon, thus the pyrolysis atmosphere, in embodiments, comprises argon and oxygen. It has been found that it is possible to further increase the permeability of membranes that are pyrolyzed at high temperatures (e.g., greater than or equal to 900° C.) by conducting the pyrolysis in trace amount of oxygen in the inert gas mixture. In contrast, conventional knowledge holds that the presence of oxygen decreases permeability for membranes pyrolyzed at temperature of 550° C. or greater (see U.S. Patent Application Publication No. 2013/030592).

The pyrolysis disclosed and described herein utilizes a controlled purge gas atmosphere in which low levels of oxidant, such as oxygen, is present, the purge gas acting as a carrier gas. By using any suitable method such as a valve, the inert gas containing a specific concentration of oxygen may be introduced into the pyrolysis atmosphere. For example, the amount of oxidant, such as oxygen, in the purge atmosphere may be greater than 0 ppm and less than or equal to 200 ppm, greater than or equal to 10 ppm and less than or equal to 200 ppm, greater than or equal to 15 ppm and less than or equal to 200 ppm, greater than or equal to 20 ppm and less than or equal to 200 ppm, greater than or equal to 25 ppm and less than or equal to 200 ppm, greater than or equal to 50 ppm and less than or equal to 200 ppm, greater than or equal to 75 ppm and less than or equal to 200 ppm, greater than or equal to 100 ppm and less than or equal to 200 ppm, greater than or equal to 125 ppm and less than or equal to 200 ppm, greater than or equal to 150 ppm and less than or equal to 200 ppm, greater than or equal to 175 ppm and less than or equal to 200 ppm, greater than 0 ppm and less than or equal to 175 ppm, greater than or equal to 10 ppm and less than or equal to 175 ppm, greater than or equal to 15 ppm and less than or equal to 175 ppm, greater than or equal to 20 ppm and less than or equal to 175 ppm, greater than or equal to 25 ppm and less than or equal to 175 ppm, greater than or equal to 50 ppm and less than or equal to 175 ppm, greater than or equal to 75 ppm and less than or equal to 175 ppm, greater than or equal to 100 ppm and less than or equal to 175 ppm, greater than or equal to 125 ppm and less than or equal to 175 ppm, greater than or equal to 150 ppm and less than or equal to 175 ppm, greater than 0 ppm and less than or equal to 150 ppm, greater than or equal to 10 ppm and less than or equal to 150 ppm, greater than or equal to 15 ppm and less than or equal to 150 ppm, greater than or equal to 20 ppm and less than or equal to 150 ppm, greater than or equal to 25 ppm and less than or equal to 150 ppm, greater than or equal to 50 ppm and less than or equal to 150 ppm, greater than or equal to 75 ppm and less than or equal to 150 ppm, greater than or equal to 100 ppm and less than or equal to 150 ppm, greater than or equal to 125 ppm and less than or equal to 150 ppm, greater than 0 ppm and less than or equal to 100 ppm, greater than or equal to 10 ppm and less than or equal to 100 ppm, greater than or equal to 15 ppm and less than or equal to 100 ppm, greater than or equal to 20 ppm and less than or equal to 100 ppm, greater than or equal to 25 ppm and less than or equal to 100 ppm, greater than or equal to 50 ppm and less than or equal to 100 ppm, greater than or equal to 75 ppm and less than or equal to 100 ppm, greater than or equal to 100 ppm and less than or equal to 100 ppm, greater than 0 ppm and less than or equal to 75 ppm, greater than or equal to 10 ppm and less than or equal to 75 ppm, greater than or equal to 15 ppm and less than or equal to 75 ppm, greater than or equal to 20 ppm and less than or equal to 75 ppm, greater than or equal to 25 ppm and less than or equal to 75 ppm, greater than or equal to 50 ppm and less than or equal to 75 ppm, greater than or equal to 75 ppm and less than or equal to 75 ppm, greater than 0 ppm and less than or equal to 50 ppm, greater than or equal to 10 ppm and less than or equal to 50 ppm, greater than or equal to 15 ppm and less than or equal to 50 ppm, greater than or equal to 20 ppm and less than or equal to 50 ppm, greater than or equal to 25 ppm and less than or equal to 50 ppm, greater than or equal to 50 ppm and less than or equal to 50 ppm, greater than 0 ppm and less than or equal to 25 ppm, greater than or equal to 10 ppm and less than or equal to 25 ppm, greater than or equal to 15 ppm and less than or equal to 25 ppm, greater than or equal to 20 ppm and less than or equal to 25 ppm, greater than 0 ppm and less than or equal to 20 ppm, greater than or equal to 10 ppm and less than or equal to 20 ppm, greater than or equal to 15 ppm and less than or equal to 20 ppm, greater than 0 ppm and less than or equal to 15 ppm, greater than or equal to 10 ppm and less than or equal to 15 ppm, or greater than 0 ppm and less than or equal to 10 ppm. It has been found that in embodiments disclosed and described herein, increasing the oxygen content to 100 ppm or even 200 ppm unexpectedly increases the permeability of the CMS membrane. However, at oxygen contents rising above 100 ppm selectivity begins to decrease, and at oxygen contents above 200 ppm the selectivity becomes undesirable. It is envisioned that the range of acceptable concentration of oxidant in the pyrolysis purge gas atmosphere may be greater than or equal to any of the concentrations described herein, including 0 ppm, and less than or equal to any of the temperatures described herein.

In embodiments, the oxidant added to the purge gas atmosphere used in the pyrolysis may be selected from the group consisting of gaseous oxygen, $CO_2$, nitrogen oxide ozone, hydrogen peroxide, steam, and air.

After pyrolysis, the hollow fiber CMS membrane that has formed is cooled to temperature near room temperature, such as less than or equal to 50° C. The cooling may be at any useful rate, such as passively cooling (e.g., turning off the power to the furnace and allowing to cool naturally). Alternatively, it may be desirable to more rapidly cool such as by using known techniques to realize faster cooling. Known techniques include, but are not limited to, cooling fans or employment of water cooled jackets or opening the furnace to the surrounding environment.

In embodiments, the hollow fiber CMS membrane may be asymmetric. As used herein, the term "asymmetric" refers to a property of the hollow fiber CMS membrane in which the hollow fiber CMS membrane has at least one relatively more dense layer and at least one relatively less dense layer. For instance, in embodiments, one layer of the hollow fiber CMS membrane may be greater than or equal to 1 μm and less than or equal to 10 μm and be more dense than a second layer. The second layer may be thicker than the first layer, such as greater than or equal to 20 μm to 200 μm. An asymmetric membrane may be defined as an entity composed of an extremely thin, dense skin over a thick porous substructure that may be of the same or different material as that of the dense skin layer. Asymmetric membrane may be fabricated by phase inversion to fabricate in one step or the thin layer may be coated on the pre-prepared porous support using dip coating method. These layers in the asymmetric membranes may be created physically by coating or created by chemical modification. Asymmetric membrane may be in the form of hollow fiber or film configuration. Asymmetric membrane may contain a third layer of same or different material as needed to enhance the membrane performance.

CMS membranes according to embodiments are also characterized by unique hydrogen to ethylene ($H_2/C_2H_4$) selectivity properties. For instance, Koros et al. reports an increase in $H_2/C_2H_4$ selectivity with increasing pyrolysis temperature. This is consistent with the general trend of an increase in selectivity with pyrolysis temperature that is observed for most of the gas pairs. However, it was unexpectedly found that a decrease in $H_2/C_2H_4$ selectivity was observed for samples pyrolyzed at high temperature (e.g., greater than or equal to 900° C.). In addition, it has also been found that membrane permeability can also be improved by pyrolyzing membranes with reduced skin thickness at higher temperature, as disclosed and described herein.

According to embodiments, the hollow fiber carbon membrane has a hydrogen to ethylene ($H_2/C_2H_4$) selectivity (calculated as defined below) that is less than or equal to 50 when treating a stream containing an equal amount of hydrogen and ethylene, such as less than or equal to 45, less than or equal to 40, less than or equal to 35, less than or equal to 30, less than or equal to 25, less than or equal to 20, less than or equal to 15, or less than or equal to 10.

EXAMPLES

The following examples are illustrative in nature and should not serve to limit the scope of the present application.

CMS Preparation

The CMS membranes were made using 6FDA:BPDA-DAM polymer. The 6FDA:BPDA-DAM was acquired from Akron Polymer Systems, Akron, OH. The polymer was dried under vacuum at 110° C. for 24 hours and then a dope was formed. The dope was made by mixing the 6FDA:BPDA-DAM polymer with solvents and compounds in Table 1 and roll mixed in a glass bottle sealed with a polytetrafluoroethylene (TEFLON™) cap and a rolling speed of 5 revolutions per minute (rpm) for a period of about 3 weeks to form a homogeneous dope.

TABLE 1

| Dope Formulation<br>Dope Composition | | |
|---|---|---|
| Component | mass (grams) | weight % |
| 6FDA:BPDA-DAM | 60.0 | 20.0 |
| NMP | 142.7 | 47.5 |
| THF | 30.0 | 10.0 |
| Ethanol | 48.0 | 16.0 |
| $LiNO_3$ | 19.5 | 6.5 |

NMP is N-Methyl-2-pyrrolidone and THF is tetrahydrofuran.

The homogeneous dope was loaded into a 500 milliliter (mL) syringe pump and the dope was allowed to degas overnight by heating the pump to a set point temperature of 50° C. to 60° C. using a heating tape.

Bore fluid (85 wt % NMP and 15 wt % water, based on total bore fluid weight) was loaded into a separate 100 ml syringe pump and then the dope and bore fluid were co-extruded through a spinneret operating at a flow rate for of 180 milliliters per hour (mL/hr) for the dope; 60 mL/hr bore fluid, filtering both the bore fluid and the dope in line between delivery pumps and the spinneret using 40 μm and 2 μm metal filters. The temperature was controlled using thermocouples and heating tape placed on the spinneret, dope filters and dope pump at a set point temperature of 70° C.

After passing through a fifteen centimeter (cm) air gap, the nascent fibers that were formed by the spinneret were quenched in a water bath (50° C.) and the fibers were allowed to phase separate. The fibers were collected using a 0.32 meter (m) diameter polyethylene drum passing over TEFLON guides and operating at a take-up rate of 30 meters per minute (m/min).

The fibers were cut from the drum and rinsed at least four times in separate water baths over a span of 48 hours. The rinsed fibers in glass containers solvent exchange three times with methanol for 20 minutes and then hexane for 20 minutes before recovering the fibers and drying them under vacuum at a set point temperature of 110° C. for one hour or drying under vacuum at 75° C. for 3 hours.

The precursor fibers were pyrolized in a pyrolysis chamber having an oxygen content at room temperature (with Ar as the inert purge gas) kept between 5-10 ppm whereas for sample 6(108), oxygen content was raised to 30 ppm by introducing a premixture of 30 ppm oxygen and Ar. After the membranes were pyrolyzed, single fiber module was fabricated and tested for $CO_2/N_2$ and $C_2H_4/C_2H_6$ gas pair permeance. Later one separate measurement was conducted on $H_2/C_2H_4$ gas pair. The pyrolyzed and/or oxidized CMS hollow fibers were potted in the stainless-steel casing to test the gas separation performance. The membrane module is housed in an oven (Quincy Lab, Inc., Chicago, IL) with temperature control. The test gas flow rates are controlled by mass flow controllers (Brooks Instrument, Hatfield, PA) and pressures were monitored and controlled by pressure transducers. In these experiments, the single-fiber CMS fiber modules were maintained under constant upstream pressure at 35° C. Argon was used as the sweep gas to carry the permeate to the downstream flowmeter and gas chromatograph (GC). A Maxum II process GC (Siemens, Munich, Germany) is used to measure the composition of the permeate & sweep mixture, and a Mesalabs Bios Drycal flowmeter (Mesa Labs, Inc., Butler, NJ) is used for the permeate flow rate measurement. The volumetric flow rate from the Bios DryCal flowmeter and the composition from the GC were used to analyze the permeance and selectivity of the fibers in the test gas system.

Table 2 summarizes performance data for 6FDA-BPDA-DAM CMS membranes pyrolyzed at different temperatures.

TABLE 2

| | Pyrolysis Temp | Oxygen content | Permeance (GPU) | | | Selectivity | | |
|---|---|---|---|---|---|---|---|---|
| Sample | (° C.) | (ppm) | $CO_2$ | $H_2$ | $C_2H_4$ | $C_2H_4/C_2H_6$ | $H_2/C_2H_4$ | $CO_2/N_2$ |
| C1 | 550 | 5-10 | 316 | 505 | 23.8 | 3.7 | 187 | 24 |
| C2 | 675 | 5-10 | 57 | | 2.2 | 7 | | 40 |
| C3 | 800 | 5-10 | 19 | 26 | 0.74 | 8.5 | 1425 | 48 |
| 4 | 925 | 5-10 | 50 | 5 | 1.7 | 25 | 15 | 60 |
| 5 | 975 | 5-10 | 36 | 4 | 0.54 | 16 | 25 | 61 |
| 6 | 925 | 30 | 86 | | 1.7 | 25 | | 63 |

Table 2 shows that an initial decrease in permeability for both $CO_2$ and ethylene was observed with an increase in temperature up to 800° C. This is consistent with literature teaching which suggested a significant drop in membrane gas permeability with increasing pyrolysis temperature. However, an increase in permeability was observed as the temperature was raised greater than 800° C. to 925° C. A corresponding sharp increase in gas pair selectivity was noted for both $CO_2/N_2$ and $C_2$ pairs. For the $H_2/C_2H_4$ gas pair study, the selectivity increased with increasing pyrolysis temperature up to 800° C. A significant decrease in selectivity was observed at temperatures higher than 800° C.

An enabling example was provided for the 6FDA-PMDA-DAM CMS fiber in Table 3. Pyrolysis was conducted at high temperature at different oxygen levels in Ar gas. An increase in permeance was observed for both the gas pairs when pyrolyzed in presence of higher oxygen content.

TABLE 3

| Sample | Pyrolysis temperature (° C.) | Oxygen content (ppm) | $CO_2$ permeance (GPU) | $CO_2/N_2$ selectivity | $C_2H_4$ permeance (GPU) | $C_2H_4/C_2H_6$ selectivity |
|---|---|---|---|---|---|---|
| 7 | 925 | 5-10 | 28 | 45 | 0.8 | 23 |
| 8 | 925 | 30 | 68 | 31 | 4.2 | 19 |

Equations and testing details for the parameters measured in the Examples are provided below.

Two intrinsic properties have utility in evaluating separation performance of a membrane material: its "permeability," a measure of the hollow fiber CMS membrane's intrinsic productivity; and its "selectivity," a measure of the hollow fiber CMS membrane's separation efficiency. One typically determines "permeability" in Barrer (1 Barrer= $10^{-10}$ [$cm^3$ (STP) cm]/[$cm^2$ s cmHg], calculated as the flux ($n_i$) divided by the partial pressure difference between the hollow fiber CMS membrane upstream and downstream ($\Delta p_i$), and multiplied by the thickness of the hollow fiber CMS membrane (l).

$$P_i = \frac{n_i l}{\Delta p_i}$$

Another term, "permeance," is defined herein as productivity of asymmetric hollow fiber membranes and is typically measured in Gas Permeation Units (GPU) (1 GPU=$10^{-6}$ [$cm^3$ (STP)]/[$cm^2$ s cmHg]), determined by dividing permeability by effective membrane separation layer thickness.

$$\left(\frac{P_i}{l}\right) = \frac{n_i}{\Delta p_i}$$

Finally, "selectivity" is defined herein as the ability of one gas's permeability through the hollow fiber CMS membrane or permeance relative to the same property of another gas. It is measured as a unit less ratio.

$$\alpha_{i/j} = \frac{P_i}{P_j} = \frac{(P_i/l)}{(P_j/l)}$$

Table 2 and Table 3 provide gas separation properties of control and air exposed oxidized samples made in accordance with the subject matter described herein. Samples 1 and 7 were not oxidized and are thus comparative examples. Samples 2-6 were exposed to air at the initial air exposure temperature provided.

The results shown in Table 2 and Table 3 show the impact of pyrolysis temperature and oxygen content in the pyrolysis atmosphere as it pertains to permeance and selectivity. As can be seen in the examples, forming a CMS membrane using the pyrolysis methods disclosed and described herein provides an unexpected balance of selectivity and permeance.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A method of manufacturing a hollow fiber carbon membrane, the method comprising:

heating a polymeric precursor to a pyrolysis temperature that is greater than or equal to 900° C. and less than or equal to 1200° C.; and pyrolyzing the polymeric precursor at the pyrolysis temperature in a pyrolysis atmosphere that comprises oxygen in an amount that is greater than 0 ppm and less than 200 ppm, wherein the polymeric precursor comprises a polymer comprising monomers Ax, By, and Cz, wherein X, Y, and Z are a mole fraction of each of A, B, and C;

a sum of X+Y+Z is less than or equal to 1; and

A, B, and C are individually monomers, and wherein

A is a monomer selected from the group consisting of 6FDA, ODPA, and BTDA;

B is DAM; and

C is a monomer selected from the group consisting of BPDA and PMDA.

2. The method of claim 1, wherein the hollow fiber carbon membrane is asymmetric.

3. The method of claim 1, wherein the pyrolysis temperature is greater than or equal to 900° C. and less than or equal to 1000° C.

4. The method of claim 1, wherein the pyrolysis temperature is greater than or equal to 925° C. and less than or equal to 975° C.

5. The method of claim 1, wherein the pyrolysis atmosphere comprises oxygen in an amount that is greater than 0 ppm and less than 150 ppm oxygen.

6. The method of claim 1, wherein the pyrolysis atmosphere comprises oxygen in an amount that is greater than 5 ppm and less than 150 ppm oxygen.

7. The method of claim 1, wherein the pyrolysis atmosphere comprises oxygen in an amount that is greater than 0 ppm and less than 100 ppm oxygen.

8. The method of claim 1, wherein the pyrolysis atmosphere comprises an inert gas and oxygen.

9. The method of claim 1, wherein the pyrolysis atmosphere comprises argon and oxygen.

10. The method of claim 1, wherein the polymeric precursor comprises a polyimide.

11. A hollow fiber carbon membrane made by the method of claim 1, wherein the hollow fiber carbon membrane has a hydrogen to ethylene ($H_2/C_2H_4$) selectivity that is less than 50 when treating a stream containing an equal amount of hydrogen and ethylene.

12. A hollow fiber carbon membrane made by the method of claim 1, wherein the hollow fiber carbon membrane has a hydrogen to ethylene ($H_2/C_2H_4$) selectivity that is less than or equal to 30 when treating a stream containing an equal amount of hydrogen and ethylene.

* * * * *